(12) United States Patent
Day et al.

(10) Patent No.: US 10,429,930 B2
(45) Date of Patent: Oct. 1, 2019

(54) ACCESSIBLE TACTILE FEATURES FOR BLIND AND PARTIALLY SIGHTED PIN ENTRY AND TOUCHSCREEN USAGE

(71) Applicant: NCR Corporation, Duluth, GA (US)

(72) Inventors: Philip N. Day, Scotland (GB); Steven Birnie, Scotland (GB); Elina Jokisuu, Scotland (GB); Michael McKenna, Scotland (GB); Andrew W. D. Smith, Scotland (GB)

(73) Assignee: NCR Corporation, Atlanta, GA (US)

( * ) Notice: Subject to any disclaimer, the term of this patent is extended or adjusted under 35 U.S.C. 154(b) by 39 days.

(21) Appl. No.: 14/610,697

(22) Filed: Jan. 30, 2015

(65) Prior Publication Data

US 2016/0224113 A1   Aug. 4, 2016

(51) Int. Cl.
| | |
|---|---|
| G06F 3/041 | (2006.01) |
| G06F 3/01 | (2006.01) |
| G06F 3/16 | (2006.01) |
| G07F 19/00 | (2006.01) |
| G06Q 20/40 | (2012.01) |
| G07F 7/10 | (2006.01) |
| G06F 3/0488 | (2013.01) |

(52) U.S. Cl.
CPC .............. *G06F 3/016* (2013.01); *G06F 3/041* (2013.01); *G06F 3/04886* (2013.01); *G06F 3/167* (2013.01); *G06Q 20/4012* (2013.01); *G07F 7/1033* (2013.01); *G07F 19/201* (2013.01); *G06F 2203/0339* (2013.01); *G06F 2203/04809* (2013.01)

(58) Field of Classification Search
CPC ........ G06F 3/016; G06F 3/0416; G06F 3/167; G06Q 20/40
See application file for complete search history.

(56) References Cited

U.S. PATENT DOCUMENTS

| | | | |
|---|---|---|---|
| 7,187,394 B2* | 3/2007 | Chandane | G06F 3/04886 715/762 |
| 8,963,842 B2* | 2/2015 | Andrews | G06F 3/016 340/407.1 |
| 9,075,429 B1* | 7/2015 | Karakotsios | G06F 3/0418 |

(Continued)

OTHER PUBLICATIONS

Kane, Shaun K.; Morris, Meredith Ringel; and Wobbrock, Jacob O.; Touchplates: Low-Cost Tactile Overlays for Visually Impaired Touch Screen Users; Assets'13, Oct. 21-23, 2013, Bellevue, WA, USA.*

(Continued)

*Primary Examiner* — Benjamin C Lee
*Assistant Examiner* — Gerald L Oliver
(74) *Attorney, Agent, or Firm* — Schwegman, Lundberg & Woessner

(57) ABSTRACT

Embodiments of a tactile strip and systems including a tactile strip are generally described herein. A tactile strip may include a back side configured to be coupled to a touchscreen display and a front side opposite the back side. The tactile strip may include a plurality of tactile features on the front side, the plurality of tactile features corresponding to a plurality of displayed inputs on the touchscreen display. A user touch may be used to register contact with the touchscreen via tactile feature guidance. A selected input may be confirmed by a long press, double touch, secondary touch, or other gesture.

18 Claims, 3 Drawing Sheets

(56) References Cited

U.S. PATENT DOCUMENTS

| | | | | |
|---|---|---|---|---|
| 2003/0043123 A1* | 3/2003 | Hinckley | | G06F 3/021 |
| | | | | 345/173 |
| 2007/0059520 A1* | 3/2007 | Hatin | | G06F 3/0412 |
| | | | | 428/343 |
| 2008/0211779 A1* | 9/2008 | Pryor | | G01C 21/3664 |
| | | | | 345/173 |
| 2011/0047459 A1* | 2/2011 | Van Der Westhuizen | | |
| | | | | G06F 1/1692 |
| | | | | 715/702 |
| 2011/0109594 A1* | 5/2011 | Marcus | | G06F 3/04886 |
| | | | | 345/178 |
| 2011/0252370 A1* | 10/2011 | Chaudhri | | G06F 3/04883 |
| | | | | 715/830 |
| 2011/0260985 A1* | 10/2011 | Colley | | G06F 3/016 |
| | | | | 345/173 |
| 2013/0106589 A1* | 5/2013 | Posamentier | | G06F 3/016 |
| | | | | 340/407.1 |
| 2013/0157230 A1* | 6/2013 | Morgan | | G09B 21/02 |
| | | | | 434/114 |
| 2013/0215029 A1* | 8/2013 | Comer, Jr. | | G06F 3/016 |
| | | | | 345/161 |
| 2015/0324050 A1* | 11/2015 | Bunter | | H03K 17/964 |
| | | | | 345/173 |
| 2016/0018890 A1* | 1/2016 | Deokar | | G06F 3/016 |
| | | | | 715/702 |
| 2016/0054822 A1* | 2/2016 | Suzuki | | G06F 3/03547 |
| | | | | 345/173 |
| 2016/0179272 A1* | 6/2016 | Yairi | | G06F 3/04886 |
| | | | | 345/174 |
| 2017/0097681 A1* | 4/2017 | Ono | | G06F 3/016 |

OTHER PUBLICATIONS

Kim, Hyung Nam; Smith-Jackson, Tonya L.; and Nam, Chang S.; Elicitation of Haptic User Interface Needs of People with Low Vision; Intl. Journal of Human—Computer Interaction, 29: 488-500, 2013.*

* cited by examiner

ACCESSIBLE TACTILE FEATURES FOR BLIND AND PARTIALLY SIGHTED PIN ENTRY AND TOUCHSCREEN USAGE

BACKGROUND

Touchscreen use has become increasingly common in everyday devices. However, touchscreens pose a unique problem for blind and partially sighted individuals. It is particularly difficult for blind and partially sighted users to locate and select options on a touchscreen. Users are typically offered the opportunity to hear information as an alternative to touch-selecting options, such as having information vocalized. However, audible information is easily heard by others who are in proximity to the user and thus it is not secure for sensitive information. Vocalized confirmation is especially inappropriate for entry or confirmation of a Personal Identification Number (PIN).

SUMMARY

In various embodiments, methods and systems for locating and activating on-screen controls without using visual identification presented.

According to an embodiment, a tactile strip is provided. Specifically, a tactile strip includes a back side configured to be coupled to a touchscreen display and a front side opposite the back side. The tactile strip includes a plurality of tactile features on the front side, the plurality of tactile features corresponding to a plurality of displayed inputs on the touchscreen display.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A Self-Service Terminal (SST) may be used by a variety of users who may require differing features. An SST may include a touchscreen display without a keypad. This type of SST may be more difficult for blind and partially sighted users to access without additional accommodation. Tactile features may be used with the touchscreen to guide users to enter correct numbers, instructions, menu selections, or the like.

A touchscreen display for an SST may be difficult to navigate without audio feedback, which may not be appropriate or may not be available when entering secure information. For example, a SST may include an Automated Teller Machine (ATM). A user may wish to enter a Personal Identification Number (PIN) at the ATM to withdraw cash in association with a particular debit or identification card. Certain standards may apply to ATMs or other SSTs when a PIN is involved. For example, the ATM or SST may need to follow the Payment Card Industry PIN Transaction Security Point of Interaction Modular Security Requirements (e.g., version 4.0 or later), from June 2013. Audible prompts or specifically vocalized confirmations of selections may not satisfy these or other security requirements. A tactile feature may be used to guide a user to selections in a secure manner.

Figure 1:
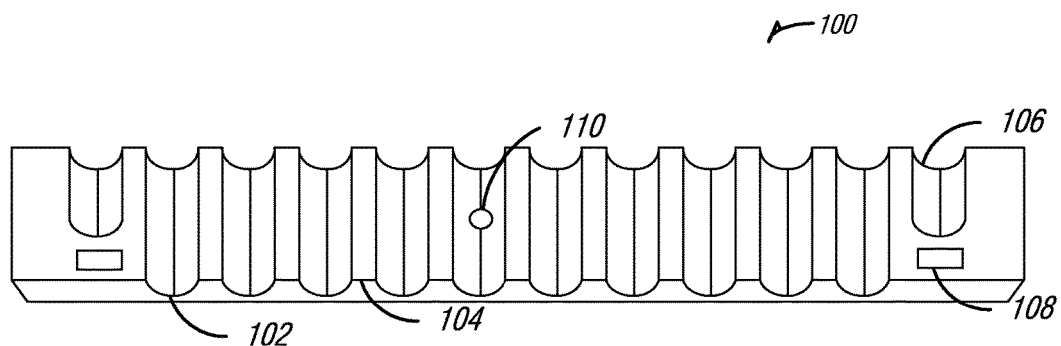
FIG. 1 is a diagram of a tactile strip, according to an example embodiment.

FIG. 1 is a diagram of a tactile strip 100, according to an example embodiment. The tactile strip 100 may include a plurality of tactile features. For example, a tactile feature may include a groove 102. The groove 102 may correspond to a number on a touchscreen display. The tactile strip 100 may include a plurality of grooves, of which groove 102 may be one. In an example, a plurality grooves on a tactile strip 100 may be separated by a plurality of ridges, such as ridge 104. In an example, the tactile strip 100 may include ten large grooves separated by nine ridges, wherein each groove corresponds to a number, such as one through nine and zero. The plurality of ridges may include a plurality of raised tactile features. In an example, the groove 102 may have a different texture than the ridge 104. For example, the groove 102 may be smooth or polished, while the ridge 104 may be rough, or vice versa. Other types of qualitative texture differences may be used as well, such as bumpy, lined, patterned, etc.

In an example, the tactile strip 100 may include a short groove 106. The short groove 106 may correspond to a menu entry on a touchscreen display. The short groove 106 may have a label 108. The label may be a tactile feature itself, such as a raised letter, number, word, braille, marking, abstract symbol, dot, etc. In another example, the label may be located in other places nearby, on, in, or around the short groove 106. For example, the label may be in the groove, above the groove, to a side of the groove, around the groove, or the like.

The tactile strip 100 may include a reference nub 110. The reference nub 110 may be used as a reference point in the plurality of grooves to indicate a predetermined number or selection, such as five. For example, the tactile strip 100 may include grooves corresponding to numbers arranged from the groove 102 as a starting point to the last groove before the short groove 106, with the numbers arranged in order from one to nine and the last groove assigned number zero. In this exemplary embodiment, the reference nub 110 may be at a groove corresponding to the number five. Other arrangements and corresponding menu items, numbers, selections, options, or the like may be used, with the reference nub 110 corresponding to any predetermined input.

The tactile strip 100 may include a back side (not shown) configured to be coupled to a touchscreen display. The back side may be coupled to the touchscreen display using double-sided tape, glue, other adhesives, a molding, embedding in a housing or the touchscreen display, screws, nails, or the like. In an example, the tactile strip 100 may include a front side opposite the back side. The front side and the back side may be connected by a left side, right side, top side, or bottom side. The sides other than the front and back sides may have a thickness, such as a thickness from a few hundred nanometers thick to a few dozen millimeters thick. In an exemplary embodiment, the tactile strip 100 may have a thickness within a few hundred nanometers above or below 0.7 millimeters. A tactile strip 100 with this type of thickness may include an adhesive strip. In another exemplary embodiment, the thickness of a tactile strip 100 may be a few dozen millimeters, such as in a plastic tactile strip. The thickness of the tactile strip 100 may vary along an axis. For example, the tactile strip 100 may taper up or down a vertical access. Grooves in the tactile strip 100 may have differing thicknesses from ridges, and both may have differing thicknesses from portions of the tactile strip 100 that are not grooves or ridges. A groove 102 may have a differing thickness from other grooves or a ridge 104 may have a differing thickness from other ridges. In another example, the short groove 106 may be separated from the other grooves by a raised broken line feature or a ridge of differing length or thickness to further separate the short groove 106 from the other grooves. In an example, the grooves or other tactile features may be arranged on a longitudinal axis of the front side or the tactile strip 100. In another example, the tactile strip 100 may not be at the same angle as the display. The tactile strip 100 may be slightly more reclined than the display to help with wrist articulation for ease of user access. Other angles may be included or mixed. For example, the a left number of grooves may be aligned at a first angle with respect to the display and a right number of grooves may be aligned at a second angle with respect to the display (e.g., two groups at different angles for ease of user access when using both hands to enter inputs).

Figure 2:
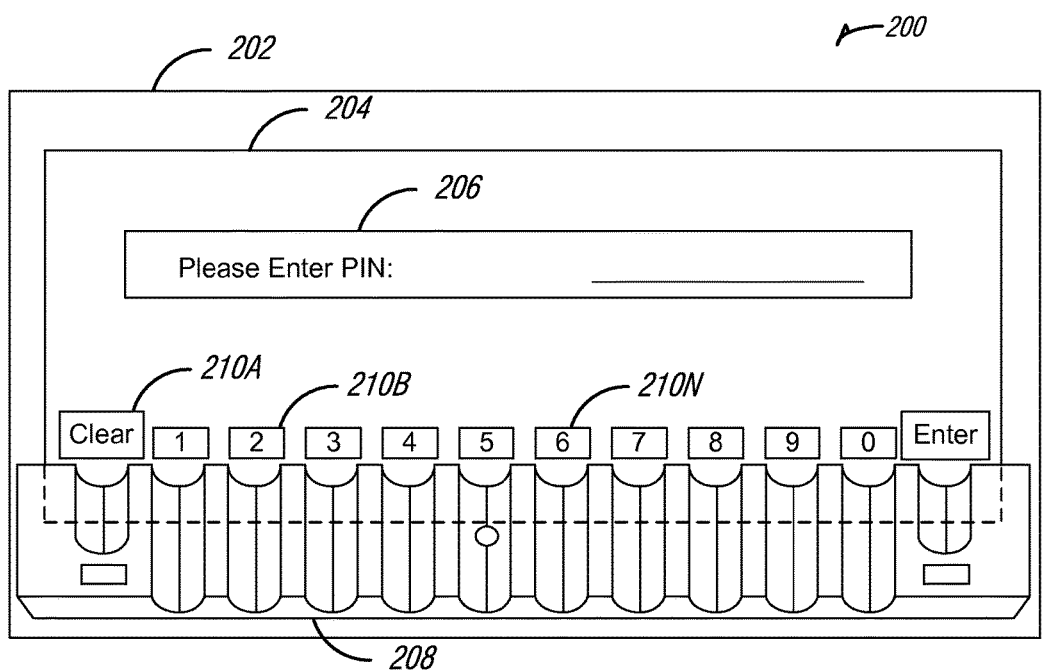
FIG. 2 is a diagram of a Self-Service Terminal (SST) with a tactile strip, according to an example embodiment.

FIG. 2 is a diagram of a Self-Service Terminal (SST) 200 with a tactile strip 208, according to an example embodiment. The tactile strip 208 may include a hard strip or a soft strip. For example, the tactile strip 208 may include a plastic strip. In another example, the tactile strip 208 may include an adhesive strip. The SST 200 may include a housing 202. The housing 202 may support the tactile strip 208, and a display 204. The display 204 may include a touchscreen or touchscreen display. The touchscreen display may include a plurality of displayed inputs. The touchscreen may display a prompt 206 for a PIN. The touchscreen may display on-screen inputs 210A, 210B, 210N. On-screen input 210A may include a menu selection, such as enter, clear, cancel, exit, etc. On-screen inputs 210B and 210N may include to a number selection. The on-screen inputs may correspond to tactile features on the tactile strip 208, such as grooves, ridges, raised tactile features, etched features, or other physical indicia. The tactile strip 208 may be coupled to the touchscreen display and may include a plurality of tactile features, the tactile features corresponding to the displayed inputs.

In an example, the display 204 may not show the prompt 206 or the on-screen inputs 210A, 210B, 210N. For example, the display 204 may be black or blank, but may still allow the on-screen inputs 210A, 210B, 210N to be selected. For example, a user may select an option to blank the screen, but may still use the tactile features to guide a finger for selection of one of the numbered inputs.

The SST 200 may include an ATM, a kiosk, a Point-of-Sale (POS) device, or the like. The SST 200 may include more than one display including more than one touchscreen. In an example, the tactile strip 208 may be molded or embedded into the housing 202. In another example, the tactile strip 208 may be coupled, affixed, attached, or connected to the housing 202 or the display 204, or some other component of the SST 200 (e.g., the touchscreen, a support structure other than the housing 202, or the like). For example, the tactile strip 208 may be glued, taped using double-sided tape, screwed, or nailed to the housing 202, the display 204, or another part of the SST 200. In another example, the tactile strip 208 may be manufactured as a component piece of the housing 202 or display 204. For example the tactile strip 208 may include a plastic tactile strip extruded or molded with the housing 202 or the display 204. In yet another example, the tactile strip 208 may be coupled to a pre-existing SST 200 on the housing 202, the display 204, the touchscreen, or otherwise, (e.g., as an after-market or after-manufacturing addition).

In an example, a user may find a number by using a finger to follow a tactile feature on the tactile strip 208 to the on-screen input 210N. The user may indicate the number by touching the display 204 at the on-screen input 210N via the tactile feature on the tactile strip 208. In an example, the number may be selected by the user using a long press (e.g., the user holds a finger on the display 204 for a predetermined amount of time), a double touch (e.g., the user touches, releases, and touches the on-screen input 210N), or a touch on the on-screen input 210N and then at another place on the display 204. The SST 200 may generate feedback to indicate that a user has touched the display 204 or feedback to indicate that a number, menu selection, choice, option, confirmation, enter, exit, cancel, or clear has been selected. For example, the SST 200 may generate an audible tone to indicate a number has been selected. In another example, the SST 200 may generate haptic feedback (e.g., haptic pulse, vibrate, etc.) to indicate a selection. In another example the SST 200 may generate visual feedback (e.g., flash, colour change, additional visual elements that are presented and then disappear, etc.). In yet another example, the SST 200 may generate visual, audible and haptic feedback to indicate a selection. The selection may be a preliminary selection (e.g., an exploratory selection) or a final selection (e.g., an entered digit of a PIN).

Figure 3:
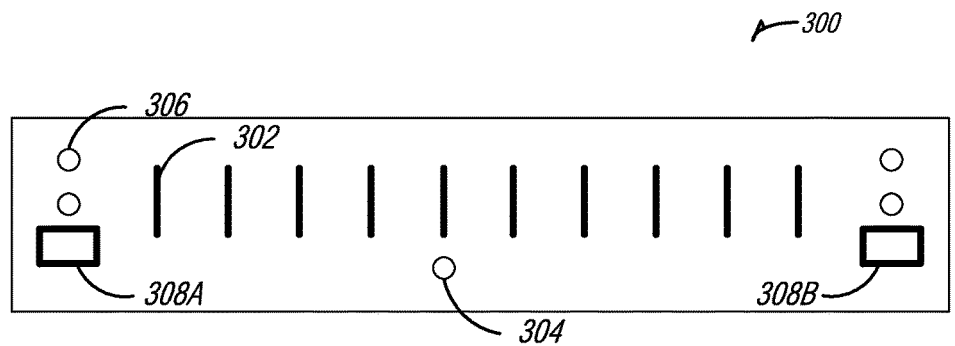
FIG. 3 is a diagram of an adhesive tactile strip, according to an example embodiment.

FIG. 3 is a diagram of an adhesive tactile strip 300, according to an example embodiment. The adhesive tactile strip 300 may include features similar to or the same as those discussed above for the tactile strip 100 in FIG. 1. In an example, the adhesive tactile strip 300 may be interchangeable with the tactile strip 100 or the tactile strip 208 in FIG. 2. The adhesive tactile strip 300 may couple to the SST 200 of FIG. 2. The adhesive tactile strip 300 may replace the tactile strip 208 of FIG. 2 in the SST 200.

In an example, the adhesive tactile strip 300 may include a plurality of tactile features, such as a raised line feature 302. The adhesive tactile strip 300 may include a reference nub 304 similar to the reference nub 110 of FIG. 1. The adhesive tactile strip 300 may include labels 308A and 308B similar to the label 108 of FIG. 1. In an example, the adhesive tactile strip 300 may include a guide dot 306. The guide dot 306 may function similarly to the short groove 106 of FIG. 1.

The adhesive tactile strip 300 may couple to a SST using an adhesive backing. In an example, the adhesive tactile strip 300 includes a back side configured to be coupled to a touchscreen display, a front side opposite the back side, and a plurality of tactile features on the front side, such as the raised line feature 302, wherein the plurality of tactile features may correspond to a plurality of displayed inputs on the touchscreen display.

In an example, the adhesive tactile strip 300 may include a plurality of raised features such as the raised line feature 302. The raised features may include features embossed onto the adhesive tactile strip 300. In an example, raised features may be painted on to the adhesive tactile strip 300. In yet another example, the adhesive tactile strip 300 may include grooves separated by ridges or raised features. The raised features may include abstract raised lines or braille.

Tactile features described above may include raised or lowered features (e.g., grooves or sunken features or raised lines or ridges).

Figure 4:
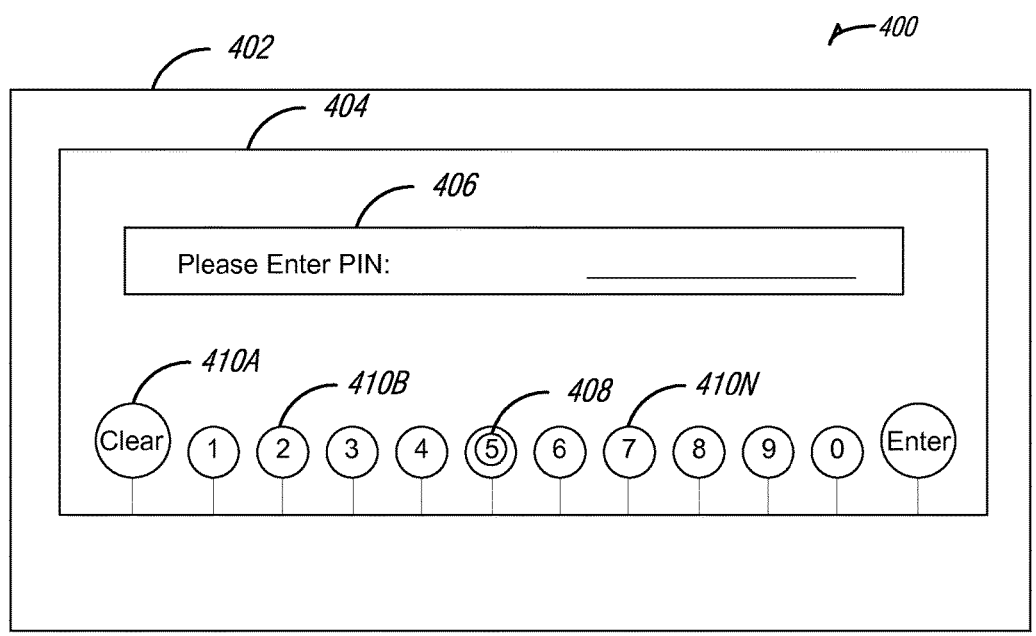
FIG. 4 a diagram of an SST with an etched tactile surface, according to an example embodiment.

FIG. 4 a diagram of an SST 400 with an etched tactile surface 404, according to an example embodiment. The SST 400 may include a housing 402. The etched tactile surface 404 may include a glass surface or a plastic surface. The etched tactile surface 404 may include a touchscreen display or may be overlaid on top of a touchscreen display. The etched tactile surface 404 may be coupled to the housing 402, the touchscreen display, or another component of the SST 400, such as a support component. The etched tactile surface 404 may include a prompt 406, such as to display a prompt to enter a PIN. In an example, the etched tactile surface 404 may display a blank view.

The etched tactile surface 404 may include etched tactile features aligned with on-screen inputs 410A, 410B, 410N. The etched tactile features may include features etched in glass, plastic, or the like. In an example, the etched tactile features may be circular. The etched tactile features may include a ridge or groove along the outside of the features to separate them from the rest of the etched tactile surface 404. For example, the etched tactile feature aligned with the on-screen input 410B may include a circular etching of a groove around the on-screen input 410B. In another example, the etched tactile feature may include a raised or lowered portion in the middle of the etched tactile feature (e.g., raised like a button, lowered so that the thickness of the etched tactile feature is less than the thickness of the rest of the etched tactile surface 404, etc.). In an example, the etched tactile features aligned with the on-screen inputs 410B and 410N may include numbers arranged from left to right from one to nine and then zero. The etched tactile feature alighted with the on-screen input 410A may include a menu option, such as clear, cancel, enter, or exit. In an example, the etched tactile surface 404 may include a reference nub 408 on an on-screen input (e.g., 410B, 410N, etc.).

In an example, the SST 400 may include a display with tactile features on a touchscreen. The tactile features may be painted, applied, or printed on to the touchscreen. A combination of painted features, applied features, printed features, or etched features may be used to create tactile features on the touchscreen.

The etched tactile surface 404 may include etched features that overlap a touchscreen portion of a display as well as housing portions or non-touchscreen portions of the display. The etched tactile surface 404 may include a touchscreen and portions of a display that house the touchscreen. For example, a user may touch an etched tactile feature in a non-touchscreen portion and move to a portion of the etched tactile feature that is in a touchscreen portion. In this example, the user may move a finger from the bottom of the etched tactile surface 404 to the on-screen inputs along the etched tactile feature that may or may not start below a touchscreen.

Figure 5:
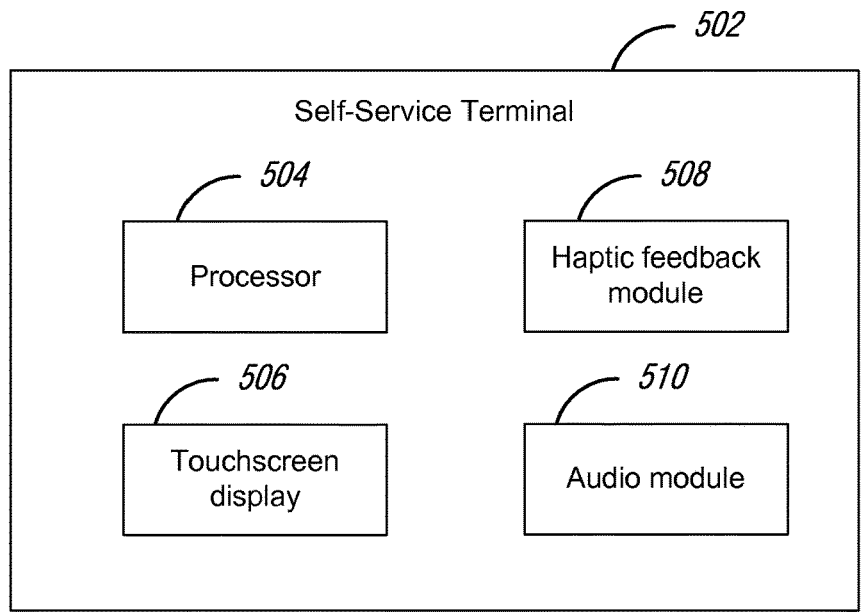
FIG. 5 is a diagram of an SST, according to an example.

FIG. 5 is a diagram of an SST 502, according to an example. The SST 502 may include a processor 504 or a touchscreen display 506. The components of the SST 502 may be programmed and reside within memory or a non-transitory computer-readable medium. The components may be executed on the processor 504. The components may be executed on one or more processors. The SST 502 may communicate with one or more networks, which may be wired, wireless, or a combination of wired and wireless. In an example, the SST 502 may be an ATM. In another example, the SST 502 may be a kiosk. In yet another example, the SST 502 may be a Point-of-Sale (POS) device. The SST 502 may include a housing. The housing may house the touchscreen display 506 or the processor 504.

In an example, the touchscreen display 506 may include a plurality of displayed inputs. For example, the inputs may include numbers one through nine and zero, (e.g., 1, 2 . . . 9, 0). The inputs may include an enter option or a clear or cancel option. The SST 502 may include a tactile strip coupled to the touchscreen display 506. The tactile strip may be a plastic strip, a metal strip, a rubber strip, an adhesive strip, a wooden strip, etc. The tactile strip may be coupled to the touchscreen display 506 using double-sided tape, glue, other adhesives, one or more screws, one or more nails, or the like. In another example, the tactile strip may be coupled to the touchscreen display 506 by being molded in to the touchscreen display 506 or to housing of the SST 502 (e.g., the tactile strip may be embedded in the housing of the SST 502 or the touchscreen display 506). The tactile strip may include a plurality of tactile features. One or more of the tactile features may correspond to one or more of the displayed inputs on the touchscreen display 506.

In another example, the touchscreen display 506 may include a plurality of etched features. For example, the touchscreen display 506 may be made of glass or plastic and the features may be etched directly on to the glass or plastic. The etched features of the touchscreen display 506 may correspond to displayed inputs on the touchscreen display 506. The touchscreen display 506 may also include a glass or plastic overlay that has etched features.

In an example, the SST 502 may include modifications to applications, software, hardware, memory, the processor, etc. to support the tactile strip or etched surface. For example, the SST 502 may include a haptic feedback module 508, an actuator such as a linear resonant actuator, or a motor to create haptic feedback. The SST 502 may use the haptic feedback module 508, actuator or motor to create a vibration when outputting haptic feedback. The SST 502 may include an audio module 510 to output audio feedback. The haptic feedback or audio feedback may be used separately or in combination to alert a user, confirm a selection, confirm entry of a number, etc. The haptic feedback module 508 may include hardware to generate the haptic feedback. The audio module 510 may include hardware to generate the audio feedback.

Figure 6:
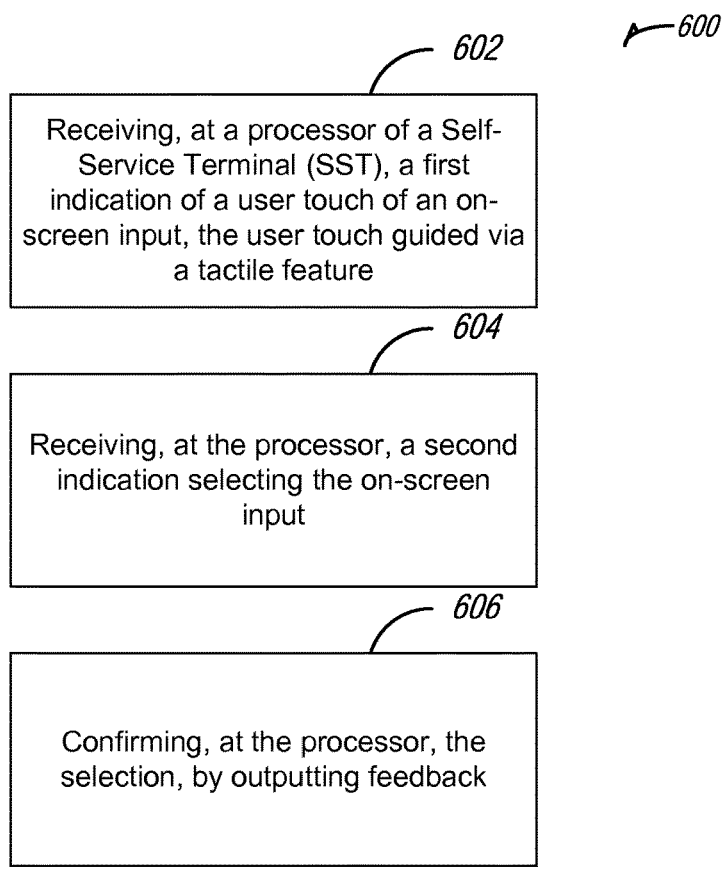
FIG. 6 is a diagram of a method for using a tactile feature, according to an embodiment.

FIG. 6 is a diagram of a method 600 for using a tactile feature, according to an embodiment. In an example, the method 600 may include an operation 602 to receive, at a processor of an SST, a first indication of a user touch on an on-screen input, the user touch guided via a tactile feature. The method 600 may include determining user touch on a touchscreen. The user touch may be used to register contact with the screen via tactile guidance and the method 600 may then set the selected input as confirmed by a long press, double touch, secondary touch, or other gesture. In an example, this portion of the method 600 may be used to avoid user input error.

In an example, the method 600 may include an operation 604 to receive, at the processor, a second indication selecting the on-screen input. The second indication may include an indication that a period of time has elapsed while the user is touching the on-screen input. For example, a user may hold down the on-screen input for a period of time, such as for a hundred milliseconds, a few hundred milliseconds, a second, a few seconds, etc. The second indication may include determining that a predetermined period of time has passed while the user is holding down the on-screen input. In another example, the second indication may include a second user touch. The second user touch may be on the on-screen input, such as a double-tap on the on-screen input. In another example, the second user touch may be in a different location on a touchscreen than the on-screen input. For example, the second user touch may be at a confirmation input, at any portion of the touchscreen, on a button not located on the touchscreen, at an adjacent on-screen input, etc.

In an example, the method 600 may include an operation 606 to confirm, at the processor, the selecting, by outputting feedback. The feedback may include any combination of one or more of an audible tone, spoken feedback, haptic feedback (e.g., a vibration or a pattern of vibrations), a flash on a screen, or the like. Feedback may include a first audible or haptic feedback and a second audible or haptic feedback (in any combination). The method 600 may include a first feedback to alert a user that the user has touched an on-screen input. The method 600 may include a second feedback to alert a user that the touched on-screen input has been selected. The second feedback may operate as a confirmation of an selected input.

In an example, the user touch or user selections described above may include encrypted touch or encrypted user selections. For example, the user selections may bypass certain software running on an SST for added security or run in a secure mode.

In an example, an SST may include a kiosk (e.g., a movie rental machine, a vending machine, etc.).

In an example, an SST may include an ATM.

In an example, an SST may include a POS.

In an example, an SST may include a card authentication system, such as for a hotel room key. The card authentication system may include a card matching or generation system or a card authenticator of a pre-made card.

In an example, an SST may include a chip and pin reader for a credit card, a debit card, an identification card, an integrated circuit card (chip card), or the like. For example, the chip and pin reader may be used to purchase goods or withdraw money (e.g., using a Europay MasterCard Visa (EMV) system).

In an example, an SST may include a payment facilitating machine (e.g., a tablet with a card reader, etc.).

In an example, an SST may include multiple operating modes, such as a standard or traditional mode and an augmented or tactile mode. The standard or traditional mode may not make use of a tactile strip or etched surface. The augmented or tactile mode may be designated to use a tactile strip or etched surface. For example, a standard number pad arrangement may be used for entering a PIN or other secure information when the SST is in the standard or traditional mode. When the SST is in the augmented or tactile mode, the SST may display numbers for selecting PIN digits corresponding to tactile features, such as those on a tactile strip or etched surface. The augmented or tactile mode may include blanking or blacking out a display screen, generating audio or haptic feedback, or adjusting touch sensitivity (e.g., allowing long press or double touch for inputs). The standard or traditional mode may be a default mode. The augmented or tactile mode may be selected by a user, such as by a user pressing a touchscreen at one or more places on the touchscreen (e.g., pressing the enter input using a tactile feature). In another example, the augmented or tactile mode may be automatically entered according to predetermined preferences. The preferences may be linked to a card, an identification, or a physical input. The physical input may include a physical button press, an electrical connection, or when a plug is inserted into an audio jack.

Various Notes & Examples

Each of these non-limiting examples can stand on its own, or can be combined in various permutations or combinations with one or more of the other examples.

Example 1 includes the subject matter embodied by a tactile strip comprising: a back side configured to be coupled to a touchscreen display, a front side opposite the back side, and a plurality of tactile features on the front side, the plurality of tactile features corresponding to a plurality of displayed inputs on the touchscreen display.

In Example 2, the subject matter of Example 1 may optionally include wherein the plurality of tactile features include a plurality of grooves.

In Example 3, the subject matter of one or any combination of Examples 1-2 may optionally include wherein the plurality of grooves are separated by a plurality of raised tactile features.

In Example 4, the subject matter of one or any combination of Examples 1-3 may optionally include wherein the back side further comprises an adhesive layer.

In Example 5, the subject matter of one or any combination of Examples 1-4 may optionally include wherein the back side is coupled to the touchscreen display using double-sided tape.

In Example 6, the subject matter of one or any combination of Examples 1-5 may optionally include wherein the touchscreen display is enclosed in a housing of a Self-Service Terminal (SST).

In Example 7, the subject matter of one or any combination of Examples 1-6 may optionally include wherein the SST is an Automated Teller Machine (ATM).

In Example 8, the subject matter of one or any combination of Examples 1-7 may optionally include wherein the plurality of tactile features are arranged on a longitudinal axis of the front side.

Example 9 includes the subject matter embodied by a Self-Service Terminal (SST) comprising: a touchscreen display, the touchscreen display comprising a plurality of displayed inputs, a tactile strip coupled to the touchscreen display, the tactile strip comprising: a plurality of tactile features, wherein a tactile feature of the plurality of tactile features corresponds to a displayed input of the plurality of displayed inputs.

In Example 10, the subject matter of Example 9 may optionally include wherein the plurality of tactile features include a plurality of grooves.

In Example 11, the subject matter of one or any combination of Examples 9-10 may optionally include wherein the plurality of grooves are separated by a plurality of raised tactile features.

In Example 12, the subject matter of one or any combination of Examples 9-11 may optionally include wherein the touchscreen display is enclosed in a housing of the SST.

In Example 13, the subject matter of one or any combination of Examples 9-12 may optionally include wherein the SST is an Automated Teller Machine (ATM).

In Example 14, the subject matter of one or any combination of Examples 9-13 may optionally include wherein the plurality of tactile features are arranged on a longitudinal axis of a front side of the tactile strip.

Example 15 includes the subject matter embodied by a method of receiving secure information using a tactile strip comprising: receiving, at a processor of a Self-Service Terminal (SST), a first indication of a user touch of an on-screen input, the user touch guided via a tactile feature, receiving, at the processor, a second indication selecting the on-screen input, confirming, at the processor, the selection by outputting feedback.

In Example 16, the subject matter of Example 15 may optionally include wherein the feedback is an audible tone.

In Example 17, the subject matter of one or any combination of Examples 15-16 may optionally include wherein the feedback is haptic feedback.

In Example 18, the subject matter of one or any combination of Examples 15-17 may optionally include wherein the tactile feature is on a tactile strip coupled to a display screen of the SST.

In Example 19, the subject matter of one or any combination of Examples 15-18 may optionally include wherein the tactile feature is an etched glass tactile feature on a touchscreen display of the SST.

In Example 20, the subject matter of one or any combination of Examples 15-19 may optionally include wherein second indication includes a second user touch of the on-screen input.

Example 21 includes the subject matter embodied by a system comprising: a touchscreen display, a tactile strip comprising: a back side coupled to the touchscreen display, a front side opposite the back side, and a plurality of tactile features on the front side, the plurality of tactile features corresponding to a plurality of displayed inputs on the touchscreen display.

In Example 22, the subject matter of Example 21 may optionally include wherein the plurality of tactile features include a plurality of grooves separated by a plurality of raised tactile features.

In Example 23, the subject matter of one or any combination of Examples 21-22 may optionally include wherein the plurality of tactile features include a plurality of etched tactile features.

In Example 24, the subject matter of one or any combination of Examples 21-23 may optionally include wherein the tactile strip includes a glass surface.

Example 25 includes the subject matter embodied by a display comprising: a touchscreen, the touchscreen including a plurality of etched tactile features, a plurality of on-screen inputs corresponding to the plurality of etched tactile features, wherein when an etched tactile feature of the plurality of etched tactile features is selected, an on-screen input of the plurality of on-screen inputs corresponding to the etched tactile feature is entered.

In Example 26, the subject matter of Example 25 may optionally include wherein the touchscreen includes a glass touchscreen and the plurality of etched tactile features include a plurality of etched glass tactile features.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A tactile strip comprising:
   a back side of the tactile strip configured to be coupled to a Self-Service Terminal (SST), the SST including a touchscreen display;
   a front side of the tactile strip located opposite of the back side;

a plurality of tactile features including a fixed geometric path located on the front side, the plurality of tactile features corresponding to locations of a plurality of displayed inputs, wherein the displayed inputs are selectable by a user on the touchscreen display, wherein the plurality of tactile features include a plurality of grooves separated by a plurality of raised tactile features, and each groove having a smooth surface and each groove corresponding to one of: a particular menu entry presented on the touchscreen display or a particular number of a number pad, wherein a first set of grooves corresponding to menu entries are shorter than a second set of grooves corresponding to numbers on the number pad, and wherein a particular groove of the second set of grooves includes a reference nub that corresponds to a predetermined number selected from the numbers; and wherein a respective tactile feature of the plurality of tactile features physically guides a finger of the user along a length of the fixed geometric path from a location outside the periphery of the touchscreen display to a location on the touchscreen display to select a respective displayed input of the plurality of displayed inputs.

2. The tactile strip of claim 1, wherein the back side further comprises an adhesive layer.

3. The tactile strip of claim 1, wherein the back side is coupled to the touchscreen display using double-sided tape.

4. The tactile strip of claim 1, wherein the touchscreen display is enclosed in a housing of a Self-Service Terminal (SST) and the tactile strip is configured to attach to the housing.

5. The tactile strip of claim 4, wherein the SST is an Automated Teller Machine (ATM).

6. The tactile strip of claim 1, wherein the plurality of tactile features are arranged on a longitudinal axis of the front side.

7. The tactile strip of claim 1, wherein the fixed geometric path is continuous.

8. The tactile strip of claim 1, wherein the plurality of tactile features include a first geometry to identify a corresponding first displayed input and a second geometry to identify a corresponding second displayed input.

9. A Self-Service Terminal (SST) comprising:
a housing;
a touchscreen display supported within the housing, the touchscreen display comprising a plurality of displayed inputs for selection by a user;
a tactile strip, including a front side and a back side, the back side coupled to the housing, the tactile strip comprising:
a plurality of tactile features located at least partially on the front side, the plurality of tactile features including a fixed geometric path;
wherein a tactile feature of the plurality of tactile features corresponds to a displayed input of the plurality of displayed inputs, wherein the plurality of tactile features include a plurality of grooves separated by a plurality of raised tactile features, and each groove having a smooth surface and each groove corresponding to one of: a particular menu entry presented on the touchscreen display or a particular number of a number pad, wherein a first set of grooves corresponding to menu entries are shorter than a second set of grooves corresponding to numbers on the number pad, and wherein the first set of grooves are aligned as a first angle with respect to the touchscreen display and the second set of grooves are aligned at a second different angle with respect to the touchscreen display; and wherein the tactile feature physically guides a finger of the user along a length of the fixed geometric path from a start point of the tactile feature, located on the front side and outside the periphery of the touchscreen display, to an end point located on the touchscreen to select the displayed input of the plurality of displayed inputs.

10. The SST of claim 9, wherein the touchscreen display is enclosed in a housing of the SST and the tactile strip is attached to the housing.

11. The SST of claim 9, wherein the SST is an Automated Teller Machine (ATM).

12. The SST of claim 9, wherein the plurality of tactile features are arranged on a longitudinal axis of a front side of the tactile strip.

13. A method of receiving secure information using a tactile strip comprising:
receiving, at a processor of a Self-Service Terminal (SST), a first indication of a user touch of an on-screen input from a touchscreen, the user touch guided via a tactile feature, wherein a finger of the user is guidable along a length of a fixed geometric path of the tactile feature from a start point on a portion of the tactile feature to an end point on the on-screen input, wherein the start point is located outside the periphery of the touchscreen display and the end point is located on the touchscreen, wherein the tactile feature is selected from a plurality of raised tactile features separated by smooth groove tactile features, each groove corresponding to one of: a particular menu entry presented on the touchscreen display or a particular number of a number pad, wherein a first set of grooves corresponding to menu entries are shorter than a second set of grooves corresponding to numbers on the number pad, wherein each groove of the first set of grooves includes a label tactile feature located beneath that groove;
receiving, at the processor, a second indication selecting the on-screen input; and
confirming, at the processor, the selection by outputting feedback.

14. The method of claim 13, wherein the feedback is an audible tone.

15. The method of claim 13, wherein the feedback is haptic feedback.

16. The method of claim 13, wherein the tactile feature is on a tactile strip coupled to a display screen of the SST.

17. The method of claim 13, wherein the tactile feature includes an etched glass tactile feature on a touchscreen display of the SST.

18. The method of claim 13, wherein second indication includes a second user touch of the on-screen input.

* * * * *